(12) United States Patent
Ahrndt et al.

(10) Patent No.: US 6,236,719 B1
(45) Date of Patent: *May 22, 2001

(54) ARRANGEMENT FOR DATA TRANSMISSION UTILIZING TELEPHONE NETWORK

(75) Inventors: Thomas Ahrndt; Stephan Binde; Martin Braun, all of Munich; Ira Hilscher, Gauting; Karl Kloppe; Hans-Werner Rudolf, both of Munich, all of (DE)

(73) Assignee: Siemens Aktiengesellschaft, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/044,567

(22) Filed: Mar. 19, 1998

(30) Foreign Application Priority Data

May 27, 1997 (DE) .................................. 197 22 155
Nov. 17, 1997 (DE) .................................. 197 50 931

(51) Int. Cl.$^7$ .................................................. H04M 11/00
(52) U.S. Cl. ................................. 379/93.08; 379/90.01; 379/93.31
(58) Field of Search ........................... 379/90.01, 93.08, 379/92.03, 93.28, 93.29, 93.31; 375/222

(56) References Cited

U.S. PATENT DOCUMENTS

| 5,663,982 | * | 9/1997 | Hodge et al. ................... 375/222 |
| 5,668,857 | * | 9/1997 | McHale ......................... 379/93.29 |
| 5,862,202 | * | 1/1999 | Basboura et al. ............. 379/100.09 |

* cited by examiner

*Primary Examiner*—Huyen Le
*Assistant Examiner*—Melur Ramakrishnaiah
(74) *Attorney, Agent, or Firm*—Schiff Hardin & Waite

(57) ABSTRACT

For modem connections via telephone lines, modems that respectively correspond to the modems of the terminal equipment side are arranged in the subscriber line circuits of the telephone switching centers as close as possible to the entry point of the subscriber line circuits. Modem communication only respectively between these pairs.

12 Claims, 2 Drawing Sheets

ARRANGEMENT FOR DATA TRANSMISSION UTILIZING TELEPHONE NETWORK

BACKGROUND OF THE INVENTION

1. Field of the Invention

The present invention is directed to an arrangement for data transmission which utilizes a telephone network connection between modems for data terminal equipment that is connected to a telephone switching center via telephone subscriber lines.

2. Description of the Related Art

In a telephone network that is utilized for data communications, modems (which include modulators and demodulators) provide a data transmission means that are arranged as a link for adapting between telephone voice paths and data terminal equipment and that serve the purpose of converting the digital signals supplied by the data terminal equipment into line signals which are advantageous for data transmission and which correspond to the electrical conditions for analog telephone connections or which undertake a back-conversion of such line signals into digital signals.

Different modulation methods, such as frequency modulation, phase-difference modulation and quadrature amplitude modulation, are applied in this context (see, for example, Handwörterbuch des elektrischen Fernmeldewesens, published on commission of the Bundesministerium für das Post- und Fernmeldewesen).

There are a multitude of different modem protocols for modem connections including, for example, those specified by the ITU-T (formerly CCITT) in what is referred to as the V-series.

FIG. 1 of the drawings shows how data transmission was previously sequenced over the telephone network.

Data signals which are derived from data terminal equipment, for example a personal computer PC1, are converted into line signals in a modulator MOD1 and are transmitted to a telephone switching center LE1 via a subscriber line TL1, which mainly serves for transmitting voice signals from and to telephone terminal equipment. In a subscriber line circuit TSCH1 to which the subscriber line TL1 is connected, the line signals experience the same handling as voice signals, namely a band limitation to 300 through 3400 Hz, an analog-to-digital conversion, a compression according to the A-law or the $\mu$-law, and are ultimately transmitted via a PCM link PCM of the telephone network SPN, to which the switching center LE1 also belongs, to a destination switching center LE2 of the telephone network to which the other data terminal equipment that is in the form of the personal computer PC2 for the connection under consideration is connected. In the subscriber line circuit TSCH2 of the destination switching center LE2, the transmitted data experience a corresponding back-conversion, namely an A-law or $\mu$-law expansion and a digital-to-analog conversion, before they are transmitted via the telephone subscriber line TL2 to the modem MOD2, in order to proceed therefrom to the data terminal equipment PC2 after conversion into digital signals.

Except for the data terminal equipment, the system parts mentioned in conjunction with the described data signal transmission, which mainly serve for voice signal transmission between telephone terminal equipment such as the illustrated terminal equipment Tel1 and Tel2, are accordingly optimized for the voice signal transmission and therefore have a limiting effect for the data transmission in view of the transmission rate and the transmission bandwidth. Highly complex modulation methods for the digital data are utilized in order to achieve an enhancement of the obtainable data rates, this, of course, resulting in correspondingly increased outlay.

Given the above-described, known way of sequencing data transmissions using the telephone network, there is a direct communication of the subscribers—as in voice signal connections—with one another. In this case, the subscribers are the modems. This requires that the subscribers must "understand one another", i.e. that the same modem protocol must be employed at both modems at the two terminal equipment sides. A further demand arises when modem protocols are reformulated since these new protocols must also cover previous modem protocols so that modems which are already installed can continue to be employed.

SUMMARY OF THE INVENTION

An object of the present invention is to provide an arrangement for data transmission utilizing the telephone network between modems for data terminal equipment connected to a telephone switching center via analog telephone subscriber lines to such effect that such modem connections are possible without the aforementioned restrictions.

Given the present inventive arrangement, accordingly, a modem that works according to the same modem protocol as the modem connected to the respective telephone subscriber line at the subscriber side is arranged in the telephone switching centers at the interfaces to affected telephone subscriber lines, i.e. those that set up a connection to the modem of a data terminal equipment. This thus means that, given a data connection between two modems for data terminal equipment at the terminal equipment side, these modems of the terminal equipment side no longer have to communicate directly with one another but need only communicate with the modem located in the switching center. The modem protocols that are applied given such a communication and, in particular, the type of encoding method employed are thus only dependent on the properties of the transmission link between the terminal equipment modem and the switching center. This enables the definition of modem protocols that cover all previous standards and that are also in the position to transmit significantly higher data rates (such as data rates >>64 kbit/s).

According to a further development of the invention, the exchange-side modems are placed as close as possible to the interface to the telephone subscriber line. All voice-signal-specific equipment in the entry region of the switching center thus no longer have to be traversed, this, as indicated, having led to limitations under the previous practice. For example, the compression and expansion according to the A-law or $\mu$-law provided for voice signals can be avoided by the present invention.

According to another development of the invention, the exchange-side modems are configured for optional operation according to different modem protocols, preferably according to all known protocols that are in practice, so that communication with any of the types of modems which may occur at the terminal equipment side is possible without further ado.

According to yet another development, the exchange-side modems are integrated in subscriber-individual physical subscriber line units or subscriber-group-individual subscriber line modules for the connection of the telephone subscriber lines.

According to yet a further development, the physical subscriber line units comprise a terminal to a data network in this case in addition to their terminal to the telephone switching center, whereby these terminals are alternatively activated for the data signals to be transmitted between the data terminal equipment. Given this construction, a subscriber equipped with an arbitrary, commercially available modem at the terminal equipment side can be conducted directly into the data network via the subscriber line of the switching center or its data network terminal. Connections to the data network, which often last for a relatively long period of time, for example, connections using Internet applications, are thus prevented from burdening the parts of the telephone network that are not individual to the subscriber, beyond the connection setup and the connection shutdown.

In another aspect, the exchange-side modems are realized by employment of a digital processor system, for example a signal processor or microprocessor. The respective, selective modem protocol behavior can then be achieved in a simple way by loading appropriate software or by replacing or regrouping corresponding function blocks.

For realizing the modems in the case of the presence of subscriber line modules, it is provided that a signal processor pool be formed that comprises fewer signal processors than subscriber line circuits in a subscriber line module, whereby the processors can be dynamically allocated at will to the subscriber line circuits. A structurally compact and cost-beneficial solution thus derives.

According to a preferred embodiment, the modems work according to the DMT method (discrete multi-tone method). The lower transmission frequency range is thereby kept free for analog voice transmission of the telephone mode, which can thus ensue simultaneously with the data transmission which occurs in the higher transmission frequency range.

BRIEF DESCRIPTION OF THE DRAWINGS

The present invention is explained in greater detail below on the basis of an exemplary embodiment with reference to the drawings.

DETAILED DESCRIPTION OF THE PREFERRED EMBODIMENTS

Figure 1:
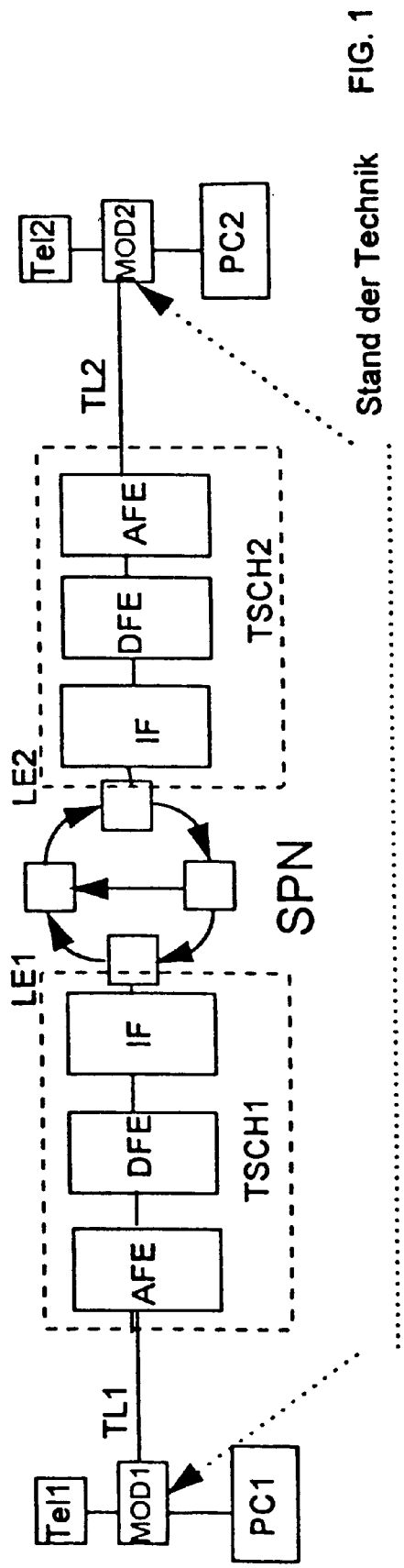
FIG. 1 is a functional block diagram showing the conditions already discussed above for data transmissions via the telephone network which takes place by the use of modem connections.
Figure 2:
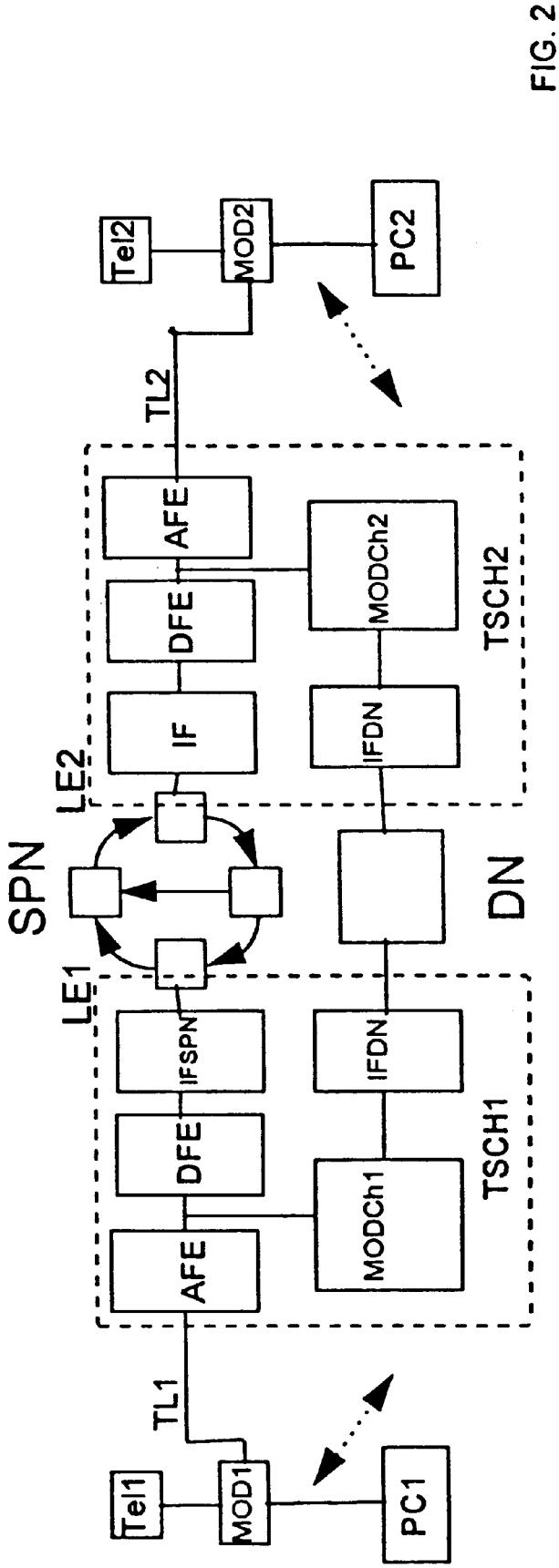
FIG. 2 is a functional block diagram of an arrangement for data transmission which utilizes the telephone network according to the present invention, whereby the presence of a data network is assumed.

In FIG. 2, parts that are the same as parts shown in FIG. 1 are provided with the same reference characters.

Differing from the apparatus shown in FIG. 1, the arrangement of FIG. 2 provides subscriber line units TSCH1 or TSCH2 of the telephone switching centers LE1 and LE2 to which modems MOD1 or, respectively, MOD2 of the terminal equipment side are connected via subscriber lines TL1 or, respectively, TL2 comprise an exchange-side modem MODCh1 or, respectively, MODCh2. These modems MODCh1 and MODCh2 are arranged as close as possible to the interface to the telephone subscriber line TL1 or, respectively, TL2, namely following a means AFE, which represents the analog part of the interface, in which the analog-to-digital conversion or, respectively, digital-to-analog conversion also occurs.

The modems MODCh1 and MODCh2 are connected to an interface circuit IFDN that leads to a data terminal at a data network DN.

The data network can, for example, be the Internet. An Internet connection will, thus, only occupy central parts of the switching centers LE1 and LE2 in the stage of the connection setup and only make use of parts individually associated with the subscriber line or, respectively, subscriber line group during the entire Internet connection. Modem communications during the course of such a connection between the personal computers PC1 and PC2 only have to occur between the modem MOD1 and the modem MODCh1, on the one hand, and the modem MOD2 and the modem MODCh2, on the other hand.

However, it also continues to be possible to conduct the data communication via the telephone network in its full scope or at least in a greater scope. This can be necessary when the switching center at the B-subscriber side of a data connection is not equipped according to the present invention.

Figure 3:
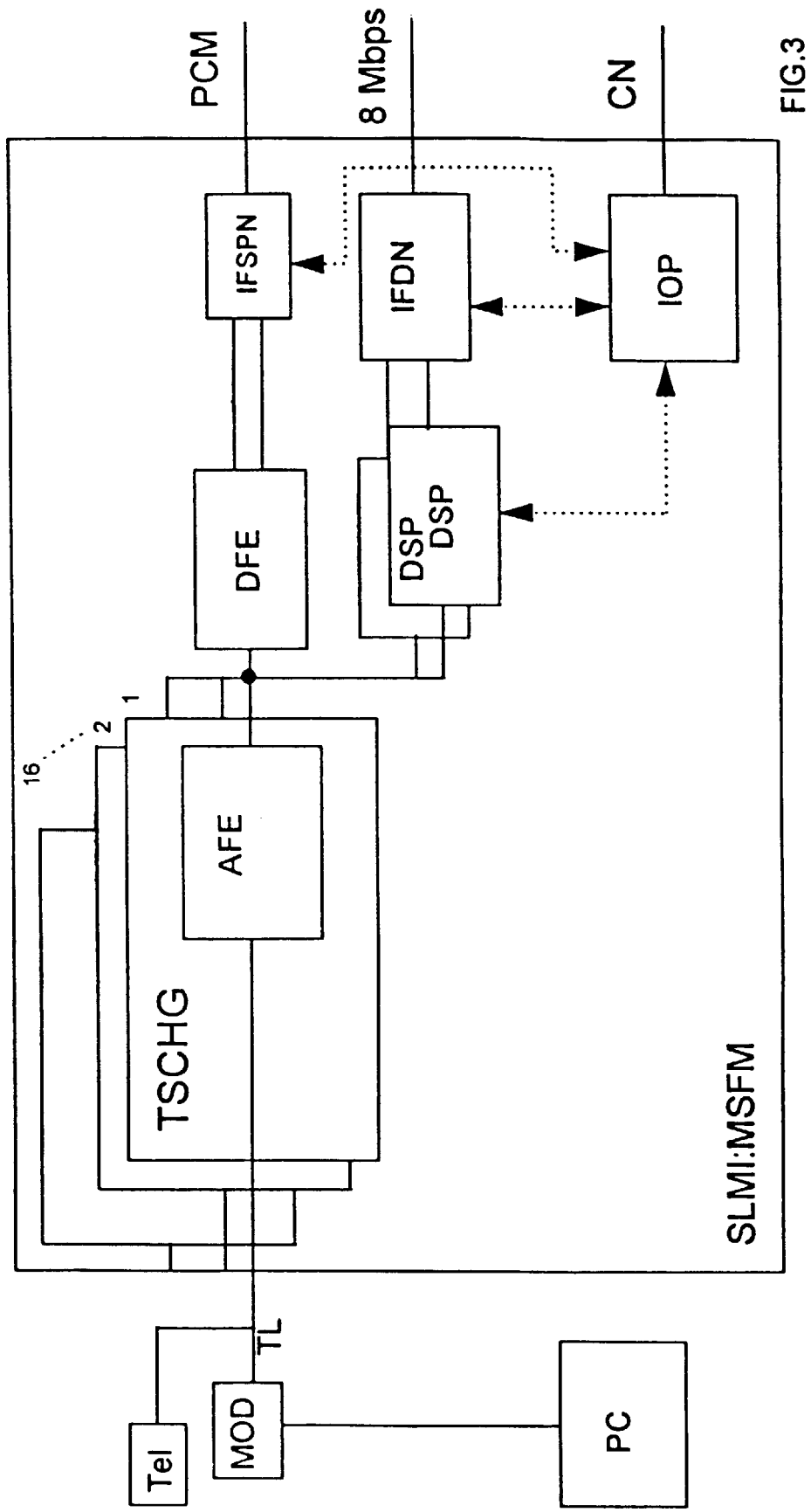
FIG. 3 is a functional block diagram of a subscriber line module with equipment according to a specific embodiment of the invention.

With reference to FIG. 3, a subscriber line module SLMI:MSFM for subscriber lines TL that connect to data terminal equipment, such as a personal computer, PC constructed according to a specific development of the invention is shown in greater detail. Let such a subscriber line module SLMI:MSFM serve for the connection of 16 subscribers and therefore comprise 16 subscriber circuits TSCHG that essentially contain the analog part AFE of the line interface as also shown in FIG. 2. The digital interface part DFE (shown in FIG. 1) for the voice signals, in which—among other things—the compression or, respectively, expansion according to the A-law or, respectively, $\mu$-law as well as the line impedance matching ensues, is provided here as a means shared by the 16 subscriber line circuits. The same is true of the interface IFSPN to the PCM line PCM leading to the central part of the switching center.

The compression or, respectively, expansion ensuing according to the A-law or $\mu$-law and A/D or, respectively, D/A conversion are mixed analog-digital functions and are allocated here to the analog part AFE of the line interface. This allocation requires a drive of the analog line interface AFE in order to activate or suppress compression and expansion on request.

The modems which are referenced MODCh1 or, respectively, MODCh2 in FIG. 2 are realized here in the form of digital signal processors DSP that can work according to all known modem protocols, to which end the corresponding software is respectively loaded. When new protocols arise, the software merely has to be updated.

In the illustrated case, the signal processors are not permanently allocated to the individual subscriber circuits TSCH but form a pool that comprises fewer signal processors than subscriber line circuits TSCH in the subscriber line module SLMI:MSFM. They can be dynamically allocated to these subscriber line circuits.

The digital signal processors DSP as well as the interface IF are under the control influence of a control processor IOP that is influenced proceeding from a control network CN and with which—among other things—a determination is also made as to whether that data signals handled by one of the signal processors are supplied to the data network via the interface IFDN or to the voice network via the interface IFSPN.

According to a development of the invention, the modems work according to the DMT method (discrete multi-tone method). In this method, a plurality of carrier signals are utilized for the transmission, so that the transmission channel is subdivided into n sub-channels. In the modulation of the data, tones of a specific frequency are thereby generated, these are combined and sent over the line as "DMT symbol".

In the embodiment of the present invention, the lower transmission frequency range is reserved for analog voice transmission of the telephony mode; the data transmission occurs in the higher transmission frequency range and can ensue simultaneously with the telephony mode.

Although other modifications and changes may be suggested by those skilled in the art, it is the intention of the inventors to embody within the patent warranted hereon all changes and modifications as reasonably and properly come within the scope of their contribution to the art.

We claim:

1. An arrangement for data transmission utilizing a telephone network between modems for data terminal equipment connected to a telephone switching center, comprising:

telephone subscriber lines connected to subscriber telephones and subscriber computers and connecting so the telephone switching center;

a plurality of subscriber-side modems utilizing mutually different modem protocols for communication, said plurality of subscriber-side modems being connected at subscriber premise ends of said telephone subscriber lines, said subscriber-side modems connecting said subscriber computers to said subscriber premise ends;

a plurality of exchange-side modems connected to an exchange side of respective ones of the telephone subscriber lines, said exchange-side modems being in the telephone switching center at an interface to respective ones of said telephone subscriber lines, said exchange-side modems working according to a same modem protocol as corresponding ones of said subscriber-side modems connected at the subscriber premise end of corresponding ones of said telephone subscriber lines, said exchange-side modems being connected immediately adjacent to the interface to said one telephone subscriber line so that data signals to be transmitted on said one telephone subscriber line traverse few voice-signal-specific equipment and permit use of modem protocols that allow a high bit rate data transmission.

2. An improvement according to claim 1, wherein said exchange-side modem is configured to work according to a plurality of different modem protocols.

3. An improvement as claimed in claim 1, wherein said one of the telephone subscriber lines is a subscriber-individual physical subscriber line unit, and said exchange-side modem is integrated in said subscriber-individual physical subscriber line unit.

4. An improvement as claimed in claim 1, wherein said one of the telephone subscriber lines is a subscriber-group-individual subscriber line module, and said exchange-side modem is integrated in said subscriber-group-individual subscriber line module.

5. An improvement as claimed in claim 1, wherein said exchange-side modem includes a digital processor system having running software to perform said same modem protocol.

6. An improvement as claimed in claim 1, wherein said exchange-side modem includes a digital processor system with connections to other function blocks perform said same modem protocol.

7. An improvement as claimed in claim 1, further comprising:

a plurality of exchange-side modems forming a modem pool, said modem pool being connected to a greater number of the telephone subscriber lines than a number of said exchange-side modems, said exchange-side modems being dynamically allocated to the telephone subscriber lines.

8. An improvement as claimed in claim 7, wherein said plurality of exchange-side modems are signal processors.

9. An improvement as claimed in claim 1, wherein said exchange-side modem operates according to a discrete multi-tone method; and a lower transmission frequency range being kept free for analog voice transmission of a telephone mode so that data transmission and telephone use ensue simultaneously with the data transmission occurring in a higher transmission frequency range.

10. An improvement in an arrangement for data transmission utilizing a telephone network between modems for data terminal equipment connected to a telephone switching center via telephone subscriber lines, comprising a plurality of subscriber-side modems utilizing mutually different modem protocols for communication, said plurality of subscriber-side modems being connected at subscriber premise ends of a corresponding plurality of telephone subscriber lines;

a plurality of exchange-side modems connected to an exchange side of respective ones of the telephone subscriber lines, said exchange-side modems being in the telephone switching center at an interface to said respective telephone subscriber lines, said exchange-side modems working according to a same modem protocol as corresponding ones of said subscriber-side modems connected at the subscriber premise end of said corresponding telephone subscriber line.

said one of the telephone subscriber lines being a subscriber-individual physical subscriber line unit, and said exchange-side modem being integrated in said subscriber-individual physical subscriber line unit;

wherein the subscriber-individual physical subscriber line unit includes a data network terminal to a data network in addition to the data terminal equipment to the telephone switching center, said data network terminal and said data terminal equipment being alternatively activated for transmitting data signals between the data terminal equipment.

11. An improvement in an arrangement for data transmission utilizing a telephone network between modems for data terminal equipment connected to a telephone switching center via telephone subscriber lines, comprising:

a plurality of subscriber-side modems utilizing mutually different modem protocols for communication, said plurality of subscriber-side modems being connected at subscriber premise ends of a corresponding plurality of telephone subscriber lines;

a plurality of exchange-side modems connected to an exchange side of respective ones of the telephone subscriber lines, said exchange-side modems being in the telephone switching center at an interface to said respective telephone subscriber lines, said exchange-side modems working according to a same modem protocol as corresponding ones of said subscriber-side modems connected at the subscriber premise end of said corresponding telephone subscriber line.

said one of the telephone subscriber lines being a subscriber-group-individual subscriber line module, and said exchange-side modem being integrated in said subscriber-group-individual subscriber line module;

wherein the subscriber-group-individual subscriber line module includes a data network terminal to a data network in addition to the data terminal equipment to the telephone switching center, said data network terminal and said data terminal equipment being alternatively activated for transmitting data signals between the data terminal equipment.

12. An arrangement for data transmission utilizing equipment of a telephone network between modems for data terminal equipment connected to a telephone switching center via telephone subscriber lines, comprising:

a first modem connected to a telephone subscriber line at a subscriber side, said first modem operating according to a modem protocol;

a second modem that works according to the same modem protocol as said first modem, said second modem being connected to interfaces of the telephone subscriber lines at subscriber line assemblies, said subscriber line assemblies being one of subscriber-individual subscriber line assemblies and subscriber group-individual subscriber line assemblies of telephone switching centers, said second modems being connected as close as possible to an interface of the telephone subscriber lines, said second modems being connected between said interface and voice signal compression and decompression apparatus, said second modems being connected to a data network in said telephone switching centers.

* * * * *